Sept. 12, 1933. E. M. BEEBE Re. 18,946

QUICK OPENING BLOW-OFF VALVE

Original Filed April 29, 1929

Edward M. Beebe INVENTOR

BY Sayal J. Miller

ATTORNEY

Reissued Sept. 12, 1933 Re. 18,946

UNITED STATES PATENT OFFICE 18,946

QUICK OPENING BLOW-OFF VALVE

Edward M. Beebe, Shawnee, Okla.

Original No. 1,766,165, dated June 24, 1930, Serial No. 359,078, April 29, 1929. Application for reissue June 21, 1932. Serial No. 618,512

5 Claims. (Cl. 251—133)

My invention relates to blow-off valves, to be used in connection with steam boilers or in connection with any device where a controlled quick release of pressure is desired.

The objects of my invention are to provide a device of this character which is new, novel, practical and of utility, which may be easily and quickly installed; which will effect the release of pressure, or of a substance under pressure, from a steam boiler, a tank, a pump, a reservoir, a pipe line and the like, which may be opened for use instantly; which may be closed instantly; which may be operated by remote control; which will be held closed by the pressure it conserves; which will not leak; which is inexpensive to manufacture; which is easily installed; the parts of which, when worn, may be repaired on the premises and be easily and quickly replaced; which by the grinding of a valve and its valve seat, may be entirely renewed; which will be efficient in performing all the services for which it is intended.

Valves now in use have proven expensive to manufacture and to repair, if, indeed, they are susceptible of repair. Due to the wear of operation and the action of substance under pressure which frequently contains mud, sludge or other hard particles, the valves proper and their seats are quickly cut away, to such an extent that the valve may not be closed. Frequently the result is the discarding of the entire valve and its replacement. The usual valve is so constructed that its moving parts are not susceptible to quick or easy replacement and when the valve and seat are worn it must be transported to a machine shop having special equipment for grinding them.

Figure 1:
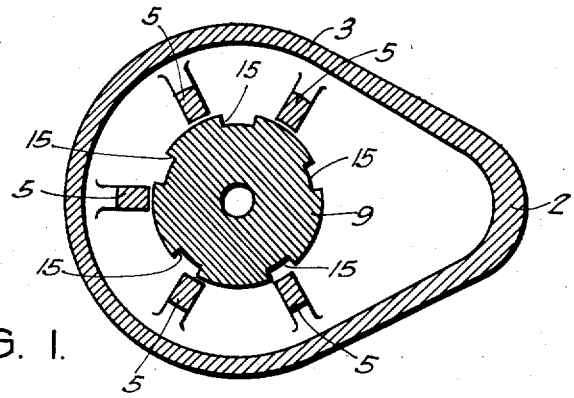
Figure 2:
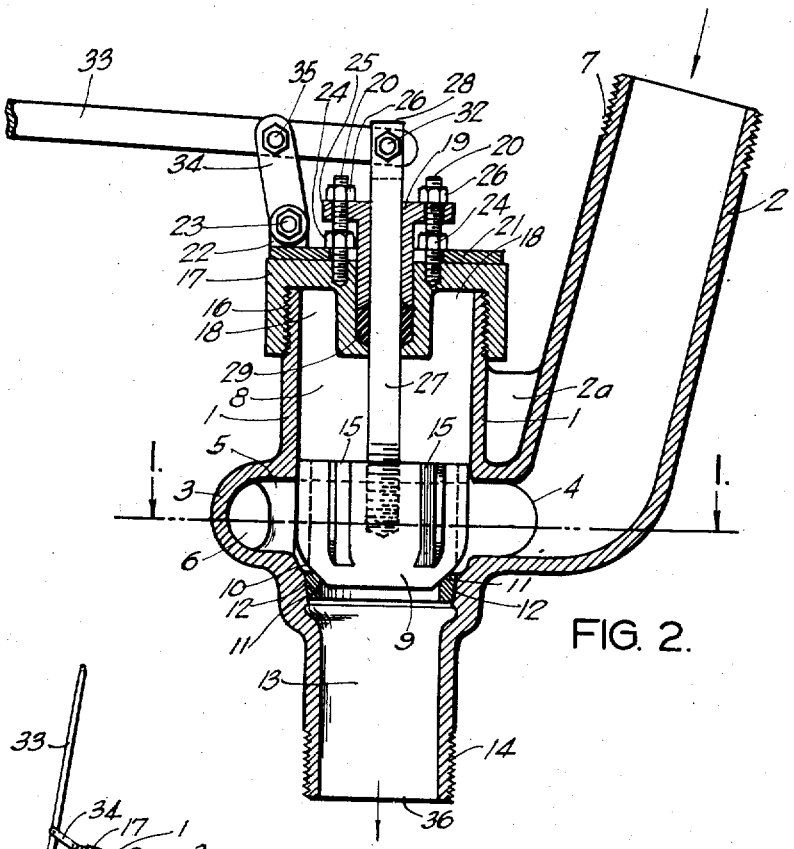
Figure 3:
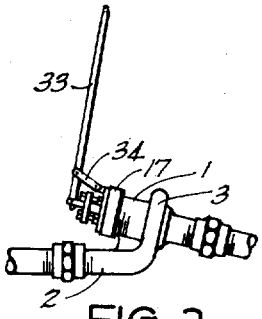

With these and other objects in view as will more fully appear my invention consists in the construction, novel features, and combination of parts hereinafter more fully described, pointed out in the claims hereto appended, and illustrated in the accompanying one sheet drawing, of which, Figure 1 is a sectional view along the broken horizontal section line showing the positioning of reinforcing ribs and valve head; Fig. 2 is an elevational sectional view; and Fig. 3 is a perspective view of the device showing it connected to a pipe line.

Like characters of reference designate like parts in all the figures.

It is understood that various changes in the form, proportion, size, shape, weight and other details of construction, within the scope of my invention may be resorted to without departing from the spirit or broad principle of my invention and without sacrificing any of the advantages thereof; and it is also understood that the drawing is to be interpreted as being illustrative and not restrictive.

A practical embodiment of the invention as illustrated in the drawing includes:

A valve housing 1 cast in one piece, inlet pipe 2 and web 2A being integral therewith. Said valve housing 1 in general is a hollow cylinder in form, having an annular central enlarged portion as shown at 3. Said enlarged portion 3 is merged into said intake pipe 2 as shown at 4. A plurality of vertical ribs 5 are cast integrally with the interior walls of said enlarged portion 3 and serve to strengthen same, and to act as a guide for a valve head 9. Said ribs 5, however, do not entirely close the bore of said ring 3 as shown at 6. The portion of said housing 1 above said ring 3 has a straight bore forming a chamber 8 for the close but not restrictive insertion and operation of said valve head 9. Said valve head 9 is generally cylindrical, is channeled or slotted vertically as shown at 15, is flat upon its top surface; tapered slightly as shown at 10 adjacent its lower extremity to make a ground joint with removable and interchangeable annular ring valve seat 11. Said ring valve seat 11 is tapered on its periphery to be held by the machine tapered walls of said housing 1, as shown at 12. Below said valve seat 11 the diameter of said housing 1 and its bore are reduced as shown at 13. The extreme lower portion of said housing 1 is standard pipe threaded as shown at 14. Extending outwardly and upwardly from said housing 1 at one side of, and connected interiorly and exteriorly with said ring 3 is said inlet pipe 2 standard pipe threaded as shown at 7. The top of said valve housing 1 is threaded as shown at 16 to receive an annular cap 17, also threaded as shown at 16. The under side of said cap 17 is channelled by a vertical annular slot shown as 18. The central portion of said cap 17 is bored from above vertically to form a well for the reception of a packing gland 19, and with a perforation through its under central portion to permit the passage therethrough of a valve stem 27. Said cap 17 is studded upwardly by a plurality of studs 20. Surmounting the flat surface of said cap 17 is annular plate 21, the central perforation of which is diametrically large enough to allow the upward extension therethrough of the plurality of said stud bolts 20. Upon the top surface of said plate 21 adjacent its outer edge is formed vertically a lug 22, perforated to hold a pivot means shown as 23. Said plate 21 is held in place by a plurality of lock nuts shown as 24, on said stud bolts 20. Said packing gland 19 is held in place by said plurality of stud bolts 20 passing upwardly through perforations in its flanged portion 25, and is adjusted by lock nuts 26. Said valve stem 27, bifurcated at its upper end portion 28, extends downwardly through said packing gland 19, through packing of any usual kind shown as 29, through the centrally perforated portion of the underside of said cap 17, through said chamber 8 and screws into the top central portion of said valve head 9. Pivoted between the forks of said bifurcated end 28 of said valve stem 27, by any usual removable means 32, extends outwardly an arm 33. By means of two links 34, pivot means 35, and said pivot means 23, said arm 33 is connected operably with said lug 22 on said plate 21.

In operation of the inlet pipe 2 of my device is connected with the outlet of the boiler, tank, pipe line or other container under pressure. Said pressure flows into the said inlet pipe 2 of my device, but is held from escape downwardly therefrom by said valve head 9 seated upon said seat 11. Fluid under pressure is permitted to freely flow around said valve head 9 through said channel 6 of said enlarged portion 3 of the housing, and thence upward into said chamber 8, through the plurality of channels 15. Thus the pressure in said inlet pipe 2 and in said chamber 8 is equalized, and is exerted downwardly upon said valve head 9, effectually keeping same tightly closed. When said valve 9 is cracked upwardly by pulling down the extended arm 33, the substance under pressure is allowed to begin flowing outwardly through the outlet 36. The pressure in said chamber 8 is thus reduced and said valve, if desired, is easily raised to a position which permits outward flow freely.

It will be seen that the wear and cutting action of the substance under pressure, upon my device is limited to the ring valve seat and the tapered portion of the valve head. Both the valve head and the ring seat may be easily removed for grinding or for replacement by new parts, by removal of said cap 17.

Obviously, the invention is susceptible of embodiment in forms other than that which is illustrated in the accompanying drawing and described herein, and applicable for uses and purposes other than as detailed, and I therefore consider as my own all such modifications and adaptations and other uses of the form of the device other than as herein described as fairly fall within the scope of my invention.

What is claimed is:

1. A quick opening valve, as described, embodying a hollow cylindrical valve housing having a circular enlarged hollow portion there surrounding, a hollow cylindrical portion extending outwardly and upwardly from one side of said enlarged portion for connecting a pipe line, a valve seat removably positioned within said housing below said enlarged portion, a vertically slotted valve head slidable in said housing adapted to seat within and hermetically seal said removable seat, a valve stem having its upper end portion bifurcated, threadedly attached to said head and extending above said housing, a centrally perforated cap threadedly attached over the upper end of said housing, a packing gland around said stem housed within said cap, an annular plate disposed above said cap, and a lever arm anchored to said plate adapted to raise and lower said stem and head.

2. A quick opening valve, as described, comprising in combination, a hollow cylindrical valve housing having a circular enlarged hollow portion there surrounding, a hollow cylindrical portion extending outwardly from one side of said enlarged portion for connecting a pipe line, a valve seat positioned within said housing below said enlarged portion, a vertically slotted valve head slidable in said housing adapted to seat within and hermetically seal said seat, the slots in said head communicating with the portion of the valve housing above said circular enlarged hollow portion, a valve stem attached to said head and extending above said housing, a centrally perforated cap attached over the upper end of said housing, a packing gland around said stem housed within said cap, and a lever arm supported on the cap and adapted to raise and lower said stem and head.

3. The combination with a valve housing having a side inlet and a bottom outlet and having a removable valve seat between said inlet and said outlet, of a slotted valve head slidable in said housing and adapted to seat within said seat to close said outlet, said slots adapted to permit pressure entering said inlet to reach the upper portion of said housing for holding said valve head closed until manually opened, and means for quickly moving said valve head for opening said outlet.

4. A quick opening valve as described, embodying a hollow generally cylindrical valve housing having a hollow cylindrical portion extending outwardly from one side for connecting a pipe line, a valve seat removably positioned within said housing below said cylindrical side portion, a movable valve member including a lower sealing portion seating within said removable valve seat for controlling communication between said side portion and the portion of the valve housing below said side portion, and a guiding portion above said sealing portion slidable in the valve housing and vertically slotted for passage of fluid to the upper side of the valve member, a centrally perforated cap removably attached to the upper end of the valve housing, said valve member having a stem projecting thru the opening in said removable cap, a packing gland supported by said cap around said stem, a lever arm connected with the valve stem and means for pivotally mounting said lever arm.

5. A quick opening valve as described, comprising in combination, a hollow generally cylindrical valve housing having an intermediate circular enlarged annular chamber and a hollow cylindrical portion extending outwardly from one side of said enlarged annular chamber portion for connecting a pipe line, a longitudinally slotted valve member slidably operating in said valve housing across said intermediate enlarged annular chamber and controlling communication between said hollow cylindrical side portion and that part of the valve housing below the enlarged annular chamber, the slots in the valve member being disposed about the periphery of said member and communicating with the housing above said annular chamber and opening to different portions of the annular surrounding chamber, a centrally perforated cap attached to the opposite end of the valve casing, the valve member having a stem projecting through said central perforation of the cap, a packing gland around said projecting portion of said valve stem and a lever arm pivotally supported on the valve housing and pivotally connected with the valve stem for raising and lowering the valve member.

EDWARD M. BEEBE.